Feb. 10, 1925.  
J. C. SCOGGINS ET AL  
1,525,593  
TRAFFIC SIGNAL FOR MOTOR VEHICLES  
Filed April 2, 1924  2 Sheets-Sheet 1
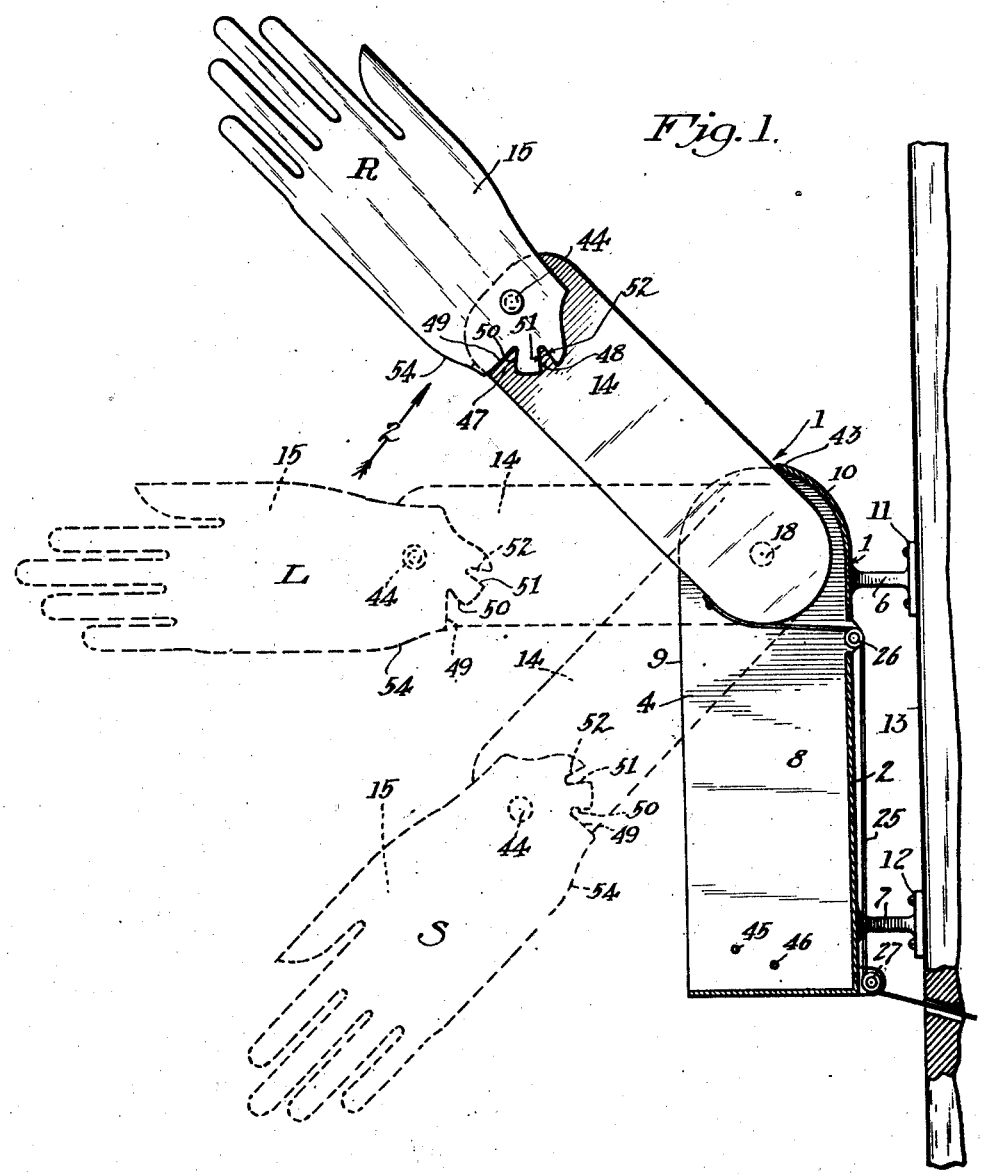
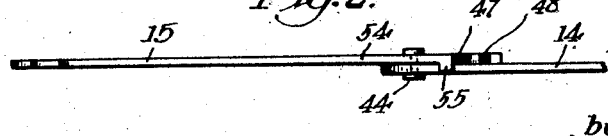

Feb. 10, 1925.
J. C. SCOGGINS ET AL
1,525,593
TRAFFIC SIGNAL FOR MOTOR VEHICLES
Filed April 2, 1924 2 Sheets-Sheet 2
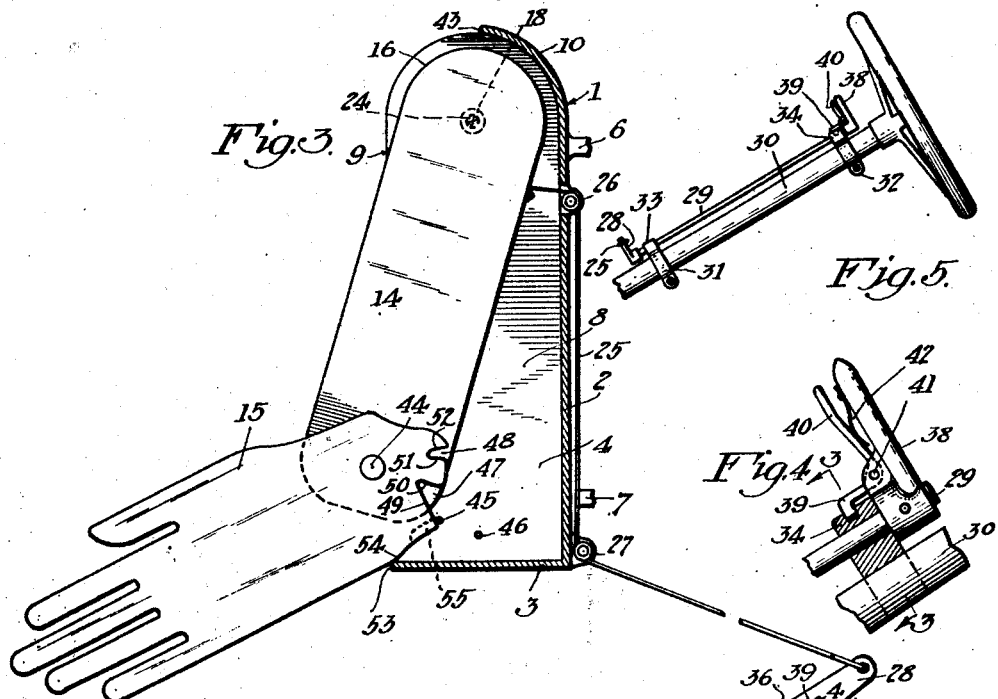
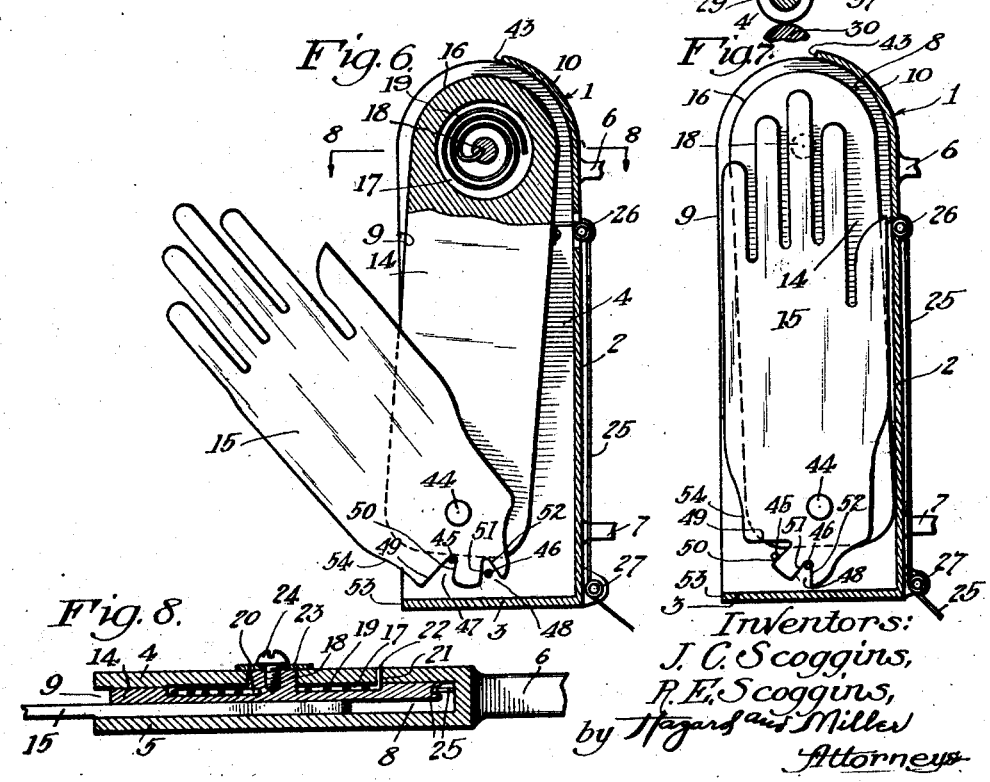
Inventors:
J. C. Scoggins,
P. E. Scoggins,
by Hazard and Miller
Attorneys Patented Feb. 10, 1925.

1,525,593

UNITED STATES PATENT OFFICE.

JESSE C. SCOGGINS AND ROBERT E. SCOGGINS, OF HUNTINGTON PARK, CALIFORNIA, ASSIGNORS, BY DIRECT AND MESNE ASSIGNMENTS, OF ONE-SIXTH TO HARRY H. COVELL AND ONE-SIXTH TO NATHANIEL CURTIS, BOTH OF HUNTINGTON PARK, CALIFORNIA.

TRAFFIC SIGNAL FOR MOTOR VEHICLES.

Application filed April 2, 1924. Serial No. 703,646.

*To all whom it may concern:*

Be it known that we, JESSE C. SCOGGINS and ROBERT E. SCOGGINS, citizens of the United States, residing at Huntington Park, in the county of Los Angeles and State of California, have invented new and useful Improvements in Traffic Signals for Motor Vehicles, of which the following is a specification.

Our invention relates to traffic signals for motor vehicles and consists of the novel features herein shown, described and claimed.

Our object is to make a device for giving the right, left and stop signals as required by law.

Another object is to make a signal that folds into a metal or fiber case.

Another object is to make a signal device that can be operated from the steering wheel so as to avoid the necessity of projecting the operators arm and hand, thereby leaving both hands free for steering and operating the vehicle.

Another object is to make a signal device operated outwardly to signaling positions by a coil spring forcing it out of the case when released from the inside of the car to any angle desired.

Another object is to make a signal device coated with radium paint, thus making it a night signal as well as a day signal.

Another object is to make a signal device which folds into a case the case being bolted at the left hand side of the vehicle.

Another object is to make a signal device which can be placed on all makes of cars and which is especially adapted to an enclosed car.

Other objects and advantages will appear from the drawings and specifications.

The drawings illustrate the invention.

Figure 1 is a vertical transverse fragmentary sectional detail of a traffic signal for motor vehicles embodying the principles of our invention and attached to the left hand side of an enclosed vehicle, the signal being shown extended in full lines outwardly and upwardly to give the right signal, and extended horizontally in dotted lines to give the left signal, and extended outwardly and downwardly in dotted lines to give the stop signal.

Fig. 2 is an edge view of the extended signal as indicated by the arrow 2 in Fig. 1.

Fig. 3 is a view on the same plane as Fig. 1 and showing the signal being folded into the case by a cord attached to a crank arm mounted upon the steering post, the transverse section of the crank arm operating rod being taken on the line 3—3 of Fig. 4.

Fig. 4 is a longitudinal sectional detail on the line 4—4 of Fig. 3.

Fig. 5 is a side elevation of the steering wheel and steering post with the signaling mechanism mounted thereon.

Fig. 6 is a view analogous to Fig. 3 and showing the signal still further folded into the case.

Fig. 7 is a view analogous to Fig. 6 and showing the signal completely folded into the case.

Fig. 8 is a horizontal cross sectional detail on the line 8—8 of Fig. 6.

The signal case 1 is a casting comprising a back 2, a bottom 3, sides 4 and 5, and brackets 6 and 7. The back 2, bottom 3 and sides 4 and 5 form a flat chamber 8 having an opening 9 at the outer side and outer half of the top. The upper portion 10 of the back 2 is substantially a quarter circle. The brackets 6 and 7 have bases 11 and 12 adapted to be secured to the side face 13 of the motor vehicle and this side face may be the side of an enclosed car or any other suitable supporting part of a motor vehicle.

The signaling member consists of an arm 14 and a hand 15. The arm 14 is flat and has a round upper end 16. A recess 17 is formed in the outer face of the arm 14 concentric to the round portion 16 and a hub 18 is formed at the axial center of the recess 17. A spiral spring 19 has one end 20 extending into an opening in the hub 18 and the spring is tightly wound and held within the recess 17 until the other end 21 is inserted into an opening 22 in the side 4. At the same time the hub 18 is inserted into an opening in the side 4. The chamber 8 is wide enough to allow the arm 14 carrying the projecting hub 18 to be inserted into the chamber 8 and the hub 18 and spring end 20 inserted into the respective openings. Then a washer 23 is placed against the outer face of the side 4 and the cap screw 24 inserted through the washer and tapped into the hub 18 to hold the arm 14 against the inner face of the side 4.

A cord 25 is attached to the inner edge of the arm 14 in a plane some distance below the plane of the hub 18 and the cord extends through an opening in the back 2 and over a pulley 26 and downwardly to a pulley 27 and the cord is connected to a crank arm 28 fixed upon the lower end of a rock shaft 29, the rock shaft 29 being mounted upon the steering post 30 by clamps 31 and 32 carrying bearings 33 and 34 in which the rock shaft is mounted. The bearing 34 has recesses 35, 36 and 37 in the periphery of its upper half. A handle 38 is fixed upon the shaft 29 against the bearing 34. A latch dog 39 is formed upon the lower end of an L shaped hand lever 40 connected to the handle 38 by a pivot 41 and operated by a spring 42. The dog 39 is adapted to engage in the recesses 35, 36 and 37. The handle 38 serves to operate the shaft 29 from one position to another when manually operated. When the handle 38 is operated to the left to swing the crank arm 28 to the left in Fig. 3 so that the latch dog 39 passes beyond the recess 35, the cord 25 is released, and the tension of the spring 19 wound clockwise in the recess 17 as shown in Fig. 6, is exerted to swing the arm 14 outwardly and upwardly until the outer edge of the arm strikes the upper outer edge 43 of the portion 10 of the back 2 as required to give the right signal in Fig. 1, and when it is desired to give the left signal, for instance, the handle 38 is operated to move the latch dog 39 to the recess 35, and when it is desired to give the stop signal the handle 38 is operated to move the latch dog 39 to the recess 36, and when it is desired to fold the arm 14 into the case 1 the handle 38 will be operated to bring the latch dog 39 into the recess 37.

The hand or pointer 15 is connected to the lower end of the arm 14 by a pivot 44. Pins 45 and 46 are fixed through the walls 4 and 5 across the chamber 8 and notches 47 and 48 are formed in the edge of the hand 15 to produce edges 49, 50, 51 and 52 to engage the pins 45 and 46. Starting from the position shown in Fig. 7, the pin 46 is in the slot 48 and when the cord 25 is released the action of the spring 19 throwing the arm 14 outwardly will cause the edge 52 to engage the pin 46 and allow the hand 15 to swing outwardly and downwardly as shown in Fig. 6, and then the pin 45 operating in the slot 47 will engage the edge 50, and continued operation of the arm 14 will swing the hand 15 downwardly to the position shown in Fig. 3, and at this time the lower edge 54 of the hand 15 is engaging the forward edge 53 of the bottom 3 and as the arm 14 moves outwardly the hand 15 will slide along the edge 53 and clear the edge and swing outwardly until a stop 55 extending from the hand 15 engages the lower edge of the arm 14 as shown in the lower outer position in dotted lines in Fig. 1, and hold the hand straight with the arm during all the outer positions.

A reverse operation caused by pulling the cord 25 to fold the signal into the case brings the edge 54 of the hand against the edge 53 of the bottom and starts to swing the hand relative to the arm and then the pin 45 engages the edge 49 and continued inward movement of the arm 14 brings the pin 46 against edge 51 until the hand is completely folded within the case as shown in Fig. 7.

Various changes may be made without departing from the spirit of our invention as claimed.

We claim:

1. A traffic signal comprising a case, a signal arm pivotally mounted in the case, a spring for swinging the signal arm out of the case, a hand pivotally connected to the signal arm, means in the case and on the hand for folding and extending the hand, and means for releasing the arm to swing outwardly to a desired position, and for pulling the arm into the case to fold the hand along side of the arm in the case.

2. In a traffic signal, a signal case having a back, a bottom and two sides, and open at the front, an arm pivotally mounted between the two sides with the pivot at the top of the sides, a hand pivotally connected to the swinging end of the arm and adapted to fold upon the arm one way and to unfold to a straight line the other way, pins fixed through the side walls across the lower end of the chamber, and there being notches forming edges in the wrist portion of the hand to engage the pins to fold the hand upwardly as the arm moves downwardly into the casing.

3. In a traffic signal, a case open at its outer side, an arm mounted in the case on a pivot extending through the upper parts of the sides of the case and adapted to swing into and out of the case, a hand pivotally connected to the swinging end of the arm at one side of the arm and having notches and edges projecting at the opposite side of the pivot from the fingers, and pins fixed in the case to engage in the notches and fold the hand upwardly when the arm swings downwardly into the case.

In testimony whereof we have signed our names to this specification.

JESSE C. SCOGGINS.
ROBERT E. SCOGGINS.